United States Patent [19]
Aiuola et al.

[11] 3,941,233
[45] Mar. 2, 1976

[54] APPARATUS FOR TRANSFERRING BODIES OF DELICATE CONSISTENCY FROM A FEED LINE TO A RECEPTION LINE

[75] Inventors: Franco Aiuola, Bologna, Italy; Herbert Rueff, Casalecchio, Italy

[73] Assignee: Azionaria Costruzioni Macchine Automatiche A.C.M.A. S.p.A., Bologna, Italy

[22] Filed: Mar. 3, 1975

[21] Appl. No.: 554,792

Related U.S. Application Data
[63] Continuation of Ser. No. 358,195, May 7, 1973, abandoned.

[52] U.S. Cl. ............ 198/20 R; 198/179; 214/1 BA; 214/1 BS
[51] Int. Cl.² ........................................ B65G 47/52
[58] Field of Search ........ 198/20 R, 179; 214/1 BA, 214/1 BS, 1 BT

[56] References Cited
UNITED STATES PATENTS

| | | |
|---|---|---|
| 3,300,063 | 1/1967 | Jensen et al. .................... 214/1 BS |
| 3,302,803 | 2/1967 | Mooney ............................. 198/20 R |
| 3,378,128 | 4/1968 | Stevenson ......................... 198/20 R |
| 3,613,571 | 10/1971 | Russell ............................. 214/1 BS |

*Primary Examiner*—Evon C. Blunk
*Assistant Examiner*—Jeffrey V. Nase
*Attorney, Agent, or Firm*—Guido Modiano; Albert Josif

[57] ABSTRACT

An apparatus for transferring bodies of delicate consistency from a feed line to a reception line, comprising a flexible closed loop member and aspirator means supported by the flexible member.

The aspirator means are mobile vertically and approach the feed and reception lines for extracting and depositing the bodies respectively in seats of the lines.

1 Claim, 4 Drawing Figures

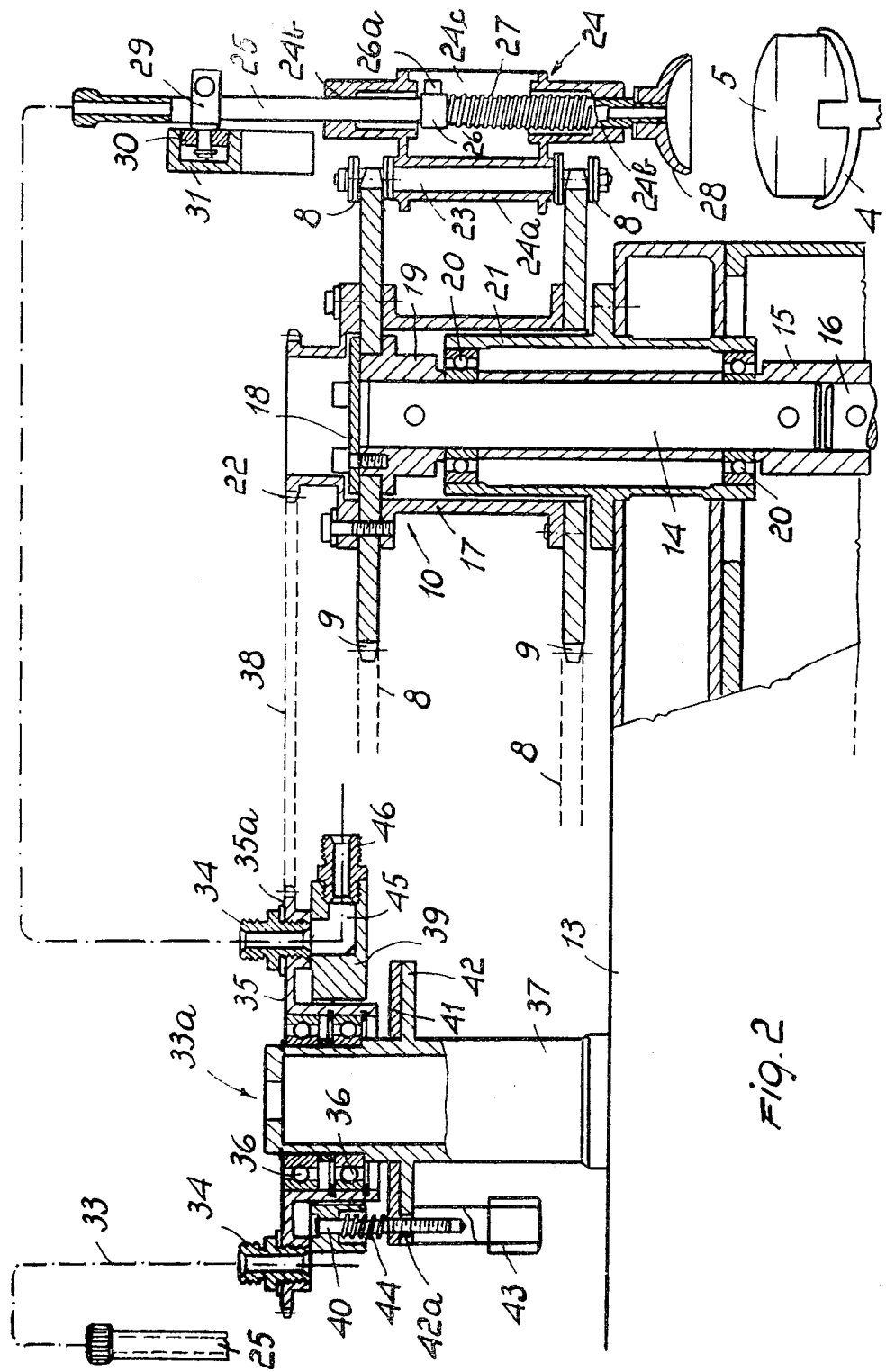

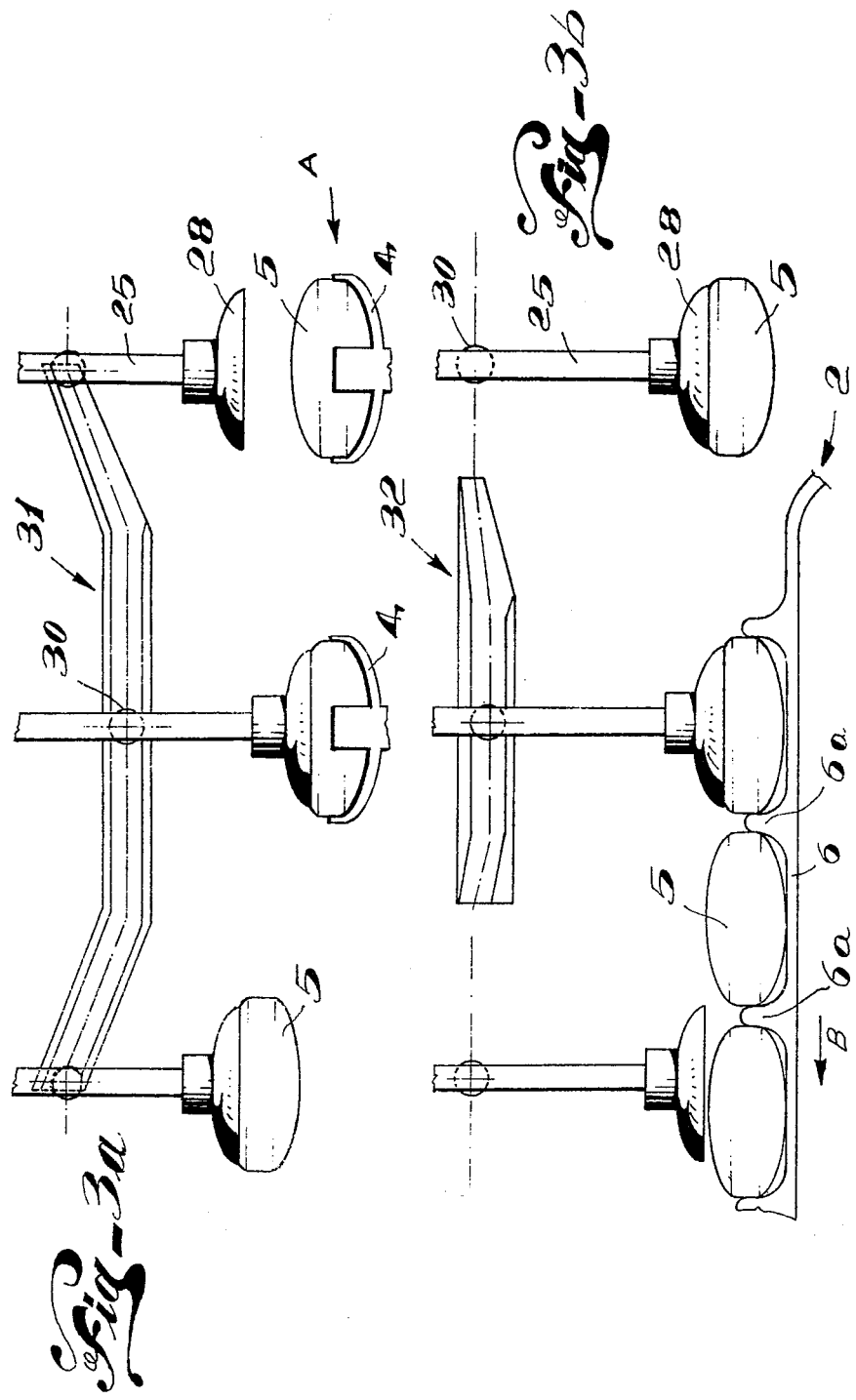

APPARATUS FOR TRANSFERRING BODIES OF DELICATE CONSISTENCY FROM A FEED LINE TO A RECEPTION LINE

This is a continuation, of application Ser. No. 358,195 filed May 7, 1973, now abandoned.

BACKGROUND OF THE INVENTION

This invention relates to an apparatus for transferring bodies of delicate consistency from a feed line to a reception line, and disposed on these lines at constant but different spacings. The apparatus is particularly suitable for transferring soaps which have not yet completely hardened.

In some productive processes bodies of a delicate nature, i.e. which are difficult to manipulate without causing them damage, are obtained, and sometimes these bodies have to be passed from a delivery line to a successive line which moves with a different speed, and be arranged on them with different spacings.

Such a problem arises at the present time particularly in the field of soap production. The pieces of soap, arriving from presses or moulding machines, proceed usually with uniform motion arranged spaced apart in respective seats in a conveying line. The pieces of soap must then be removed from this first line and, without undergoing damage, be introduced into the seats, of a different spacing to the previous ones, of a second conveying line, which is provided with intermittent motion and which feeds the machine for wrapping the soaps.

SUMMARY OF THE INVENTION

The object of the present invention is consequently to resolve the aforementioned problem in a simple and rational manner.

This object is attained by an apparatus for transferring bodies of delicate consistency from a feed line to a reception line, and disposed on said lines at constant but different spacings, comprising a flexible closed loop member lying in a horizontal plane, of which a first portion extends parallel to the terminal portion of the feed line and a second portion extends parallel to the initial portion of the reception line, and further comprising aspirator means supported by said flexible member and mobile vertically by means of cam members disposed along said first and second portions for making the aspirator means to approach the feed and reception lines along said first and second portions for extracting the bodies from, and depositing them in seats in said lines respectively by connecting the aspirator means to, and disconnecting the aspirator means from a suction pump respectively, the speed of the flexible member at the moment of activation and deactivation of the aspirator means being equal to, and in the same direction as that of the feed and reception lines.

BRIEF DESCRIPTION OF THE DRAWING

Further characteristics will be more evident from the description given hereinafter of a preferred embodiment of the apparatus according to the invention, illustrated by way of example in the accompanying drawings in which:

FIG. 2 is a vertical section through the apparatus;

FIGS. 3a and 3b are elevational views of the stages of taking the bodies from a feed line and releasing them on to the receiving line respectively.

DESCRIPTION OF THE PREFERRED EMBODIMENT

Figure 1:
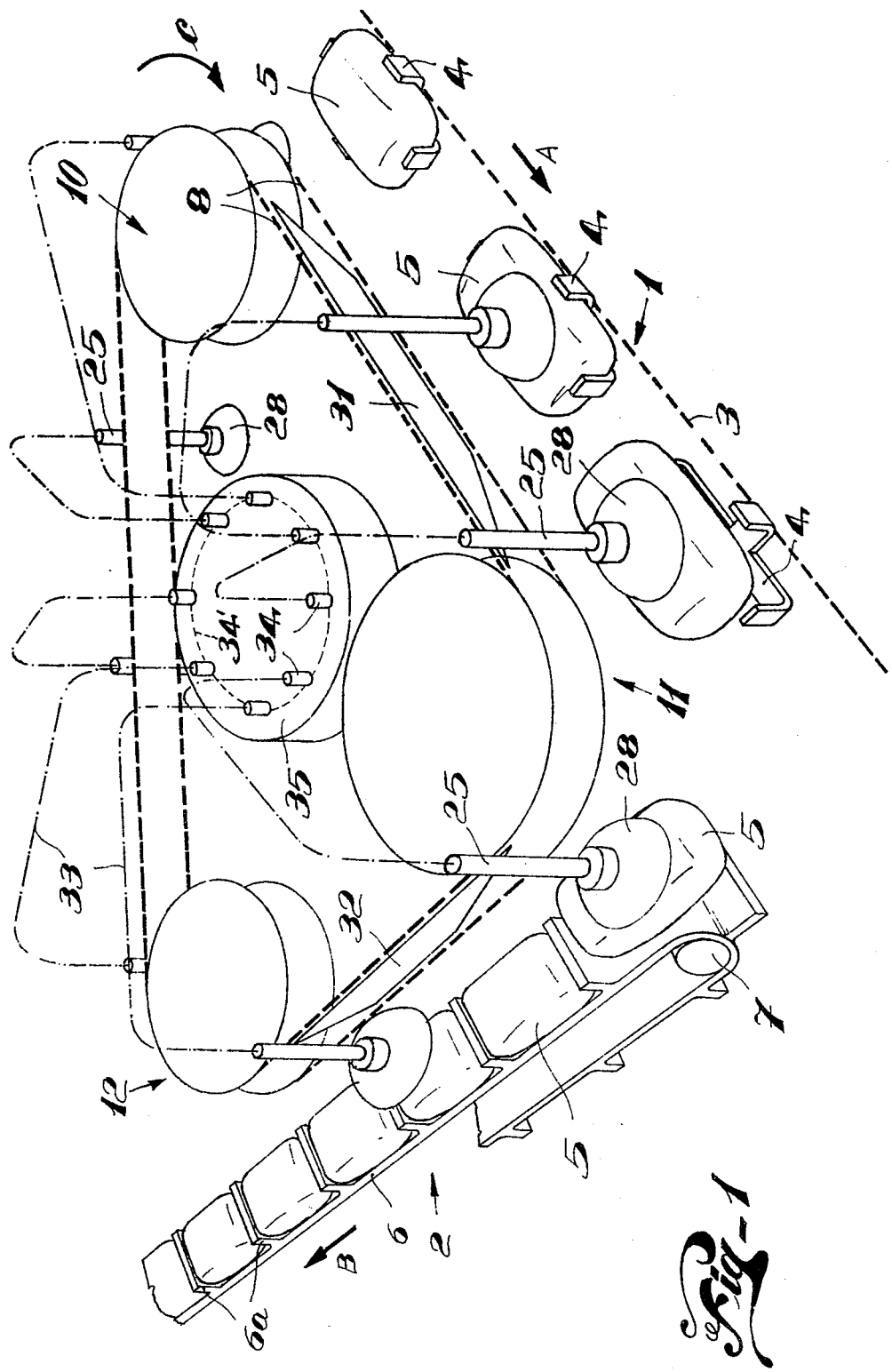
FIG. 1 is a diagrammatic perspective view of the apparatus according to the invention.

These figures show a feed or delivery line 1 and a reception line or conveyor 2. The delivery line 1 comprises a chain 3 and a series of elements 4 fixed to it and distributed at a constant spacing along it. Each element 4 consists of two crossed forks and forms a sort of cup for housing a body 5, for example a piece of soap not yet hardened, originating from a press or moulding machine. A chain 3 is closed in the form of a loop around a driving pulley and an idle pulley (not shown), the axes of which are vertical, and is driven with continuous uniform motion. The straight branch or portion of the chain 3, from which the soaps 5 will be taken, is shown in FIG. 1 and moves in the direction indicated by the arrow A. The reception line 2 consists of a flexible closed loop belt 6. This belt is provided on the outside with projections 6a distributed at a constant spacing, which is different from that of the elements 4. Between each pair of projections 6a the belt hence comprises a sort of box suitable for receiving a respective soap 5. The belt 6 winds on a driving roller and an idle roller of horizontal axes (one of these rollers is shown in FIG. 1, indicated by the reference numeral 7). The belt 6 is perpendicular to the take-off branch of the chain 3 and its upper branch moves in the direction indicated by the arrow B. In particular the spacing between the boxes defined by the projections 6a is less than the spacing between the cup elements 4 and the belt 6 is driven with intermittent motion such that, during the interval between two dwells of the belt, it reaches and maintains for a certain period of time a speed of advancement approximately constant and equal to that of the chain 3.

The apparatus, which according to the invention enables soaps 5 to be taken from the chain 3 and released into the boxes of the upper branch of the belt 6, comprises transfer conveyor including a flexible closed loop member consisting of a pair of chains 8. These chains wind around the pair of gear wheels 9 of three rotating assemblies 10, 11 and 12 of vertical axes disposed at the vertices of a right angled triangle such that the chains 8 comprise portions parallel to the take-off branch of the chain 3 and to the belt 6 respectively. Two of the said rotating assemblies are supported idly by the frame 13 of the apparatus. The third rotating assembly, as shown in FIG. 2, is fixed to the top of a shaft 14, the lower end of which is dowelled to a sleeve 15, to which the shaft 16 driven by the drive unit of the apparatus is dowelled. It will appear clear that the above described third rotation assembly constitutes driving transmission means for the said transfer conveyor. The two wheels 9 of the rotating assembly 12 are rigid one with the other by means of the drum 17 and the upper one is clamped by means of the plate 18 against the flange of a sleeve 19 dowelled to the shaft 14. The shaft 14 is rotatably mounted by way of bearings 20 in a sleeve 21 provided with an external collar for fixing to the frame 13. To the upper gear wheel 9 is also fixed a gear wheel or sprocket 22, which will be described hereinafter. The two chains 8 are connected together at their vertically aligned points of articulation by pivots 23 (FIG. 2), which are spaced along the chains. On each of the pivots 23 is disposed the sleeve 24a with which a support member 24 is rigid, forming two vertically aligned seats 24b in which the tubular stem 25 is inserted. The stem 25 is slidable vertically in the two seats 24b and is prevented from rotating by an appendix 26a of a clamp 26 locked approximately at the centre of the stem, the appendix being guided in an elongated slot 24c. The stem is forced upwards by a spring 27 interposed between the lower seat 24b and clamp 26. Below this seat, an element 28 made of elastic material and shaped in the form of a sucker is fixed to the tubular stem 25. Above the upper seat 24b, a clamp 29 is locked on the stem and is provided with a pivot on which the roller 30 is rotatably mounted. The rollers 30 of the stems 25 are designed to engage with channel cams 31 and 32 fixed to the frame 13, and disposed between the rotating assemblies 10, 11 and 11, 12 and lying in vertical planes. The cams 31, 32 comprise an intermediate horizontal portion the ends of which are turned upwards. The spacing between the stems 25 is equal to the spacing between the cup elements 4 and the chains 8 are driven with continuous motion in the direction indicated by the arrow C with the same speed as the chain 3. It will thus be appreciated that the above described driving transmission means for the transfer conveyor drive the said transfer conveyor with the same speed as the chain 3 of the feed conveyor 1. Furthermore each stem is aligned with the centre of the relative cup element 4.

The upper end of each of the tubular stems 25 is connected by way of a flexible tube 33 (in FIGS. 1 and 2 this is indicated by a dotted line) and a rotating distributor indicated overall by the reference numeral 33a, to a suction pump (not shown). The distributor comprises a disc 35 on which connectors 34 for the tubes 33 are distributed regularly about its periphery on a circumference 34' concentric therewith (FIG. 1). The disc 35 comprises a tubular portion which is rotatably mounted by way of bearings 36 on a column 37 fixed to the frame 13 and a ring gear 35a on which the chain 38 is wound and also engages with said wheel 22. The ratios between the gear wheels 22 and 35a are such that when the chains 8 have travelled through their entire length, the disc 35 has made one complete turn. Around the tubular portion of the disc 35 there is an eccentric annular element 39, the rotation of which is prevented by a series of vertical pins 40. As it appears clearly from FIG. 2, the periphery of said ring defines a surface area of the ring, eccentric with respect to the circumference on which the connectors 34 are arranged. As visible from FIG. 2 part of said circumference at the right of column 37 lies within the surface area of the ring and part thereof at the left of the column 37 lies outside said surface area. The ring 39 however can make small vertical movements guided by the pins 40. The lower portion of each pin 40 is threaded and screwed into a respective bore in a disc 41. The same lower portion of the pin then traverses a respective slot 42a in a flange 42 of the column 37. A nut 43 which engages with the pin clamps and locks the disc 41 to the flange 42. The slot 42a extends angularly along an arc concentric with the column 37, so permitting the most appropriate angular positioning of the ring 39. This latter ring is held by friction against the base of the disc 35 by the springs 44 disposed on the pins 40 and interposed between the base of the ring 39 and the disc 41. In the ring 39 there is a cavity 45, open upwards and extending angularly. This cavity is connected, by way of the connector 46 and a duct (not shown) to a suction pump. During rotation of the disc 35, the connectors 34, which gradually become positioned above the cavity 45, become connected to the suction pump so as to create aspiration at the suckers 28 connected to these connectors. It should also be noted that because of the eccentric shape of the ring 39, during the rotation of the disc 36, some of the connectors 34 (see the left hand part of FIG. 2) are connected to atmosphere and there is no aspiration at the suckers 28.

The operation of the apparatus according to the invention is as follows.

As the suckers 28 move along the branch of the chain 8 parallel with the chain 3, they are in phase with the cup elements 4 of the chain 3 in lie over them. After leaving the rotating assembly 10, the rollers 30 of the stems 25 come into engagement with the cam 31, which because of its particular shape makes the stems descend downwards and hence cause the suckers 28 to approach the soaps 5. At the same time the suckers 28 are activated because the connectors 34 arrive above the cavity 45 and sucks the soaps 5. Then the stems 25 are made to rise, taking with them the soaps 5 and removing them from the cup elements 4. When the stems 25 which support the soaps are about to lie over the belt 6, their rollers 30 engage with the cam 32, which causes the stems to descend towards the boxes on the belt. When the soap 5, carried by a sucker 28, penetrates into the corresponding box in the belt 6, this latter has reached a speed equal to that of the chains 8, and the suction on the sucker ceases (because the connector 34 of the sucker becomes connected to atmosphere), with the result that the soap is released into the box without there being any relative slip between the soap and box, i.e. between the chains 8 and the belt 6. The cam 32 causes the stem 25 which has abandoned the soap to rise, and the belt 6 decelerates and then again accelerates until it reaches an approximately constant speed for the receipt of a new soap.

From the description it is clear that the disposition which the belt 6 may have with respect to the chain 3 may be different from the perpendicular dispositions shown in FIG. 1. The chain and belt may be aligned and the chains 8 will take a straight path instead of a triangular one. The delivery line 1 may be driven with intermittent motion instead of continuous motion and vice versa the reception line 2 may be driven with continuous motion instead of intermitted motion. Furthermore the delivery line and reception line may both be driven with intermittent motion or both with continuous motion, the spacings of the bodies 5 on the one and other line being equal or different in both cases.

We claim:

1. An apparatus for transferring bodies of delicate consistency from a continuously moving feed conveyor having regularly spaced support elements for said bodies onto a reception conveyor having regularly spaced support members, said reception conveyor being driven with intermittent motion, the distance between the support elements on the feed conveyor being greater than the distance between the support members on the reception conveyor, said apparatus comprising a transfer conveyor moving along a closed path lying in a horizontal plane, said transfer conveyor having a first portion extending parallel to the feed conveyor and a second portion extending parallel to the reception conveyor, transmission means for driving said transfer conveyor with the same speed of said feed conveyor, aspirator means consisting of suckers supported by said transfer conveyor slidably in a vertical direction, cam members arranged along said first and second portion for causing the aspirator means to move vertically thereby to approach said feed conveyor in timed relation therewith to engage the bodies and then to raise for removing the bodies and to transfer and deposit them on the reception conveyor, flexible ducts and a rotating distributor connecting said suckers to a suction pump, wherein according to the improvement said rotating distributor comprises a column arranged within an area surrounded by said path of said transfer conveyor, a disc mounted for rotation on said column about a vertical axis, connectors for said flexible ducts regularly distributed on a circumference on the upper face of said disc concentrically about said vertical axis, a gear-wheel toothing on the periphery of said disc, said transmission means for driving said transfer conveyor including a driving sprocket and a chain transmissively engaging said gearwheel toothing and said driving sprocket, the transmission ratio between said gearwheel toothing and said driving sprocket being such that when the transfer conveyor has covered a way equal to its entire length, the disc has made one complete revolution, a ring member arranged underneath the face of said disc opposite to that provided with the connectors, spring means pressing said ring member against said face, support means for said ring permitting axial displacement and preventing rotation thereof, said ring having a periphery defining a surface area eccentric with respect to said circumference on which said connectors are arranged so that part of said circumference extends within said surface area and another part thereof extends outside said surface area, a cavity in said ring connected with said suction pump and opening at said surface area so as to communicate with the connectors reaching said part of said circumference during the rotation of said disc, means for angularly adjusting said ring with respect to said disc, said cavity having an angular extension such as to connect the suckers with said suction pump during removal and transfer of the bodies from the feed conveyor onto the reception conveyor and to disconnect the suckers thereafter.

* * * * *